Figure 1A:
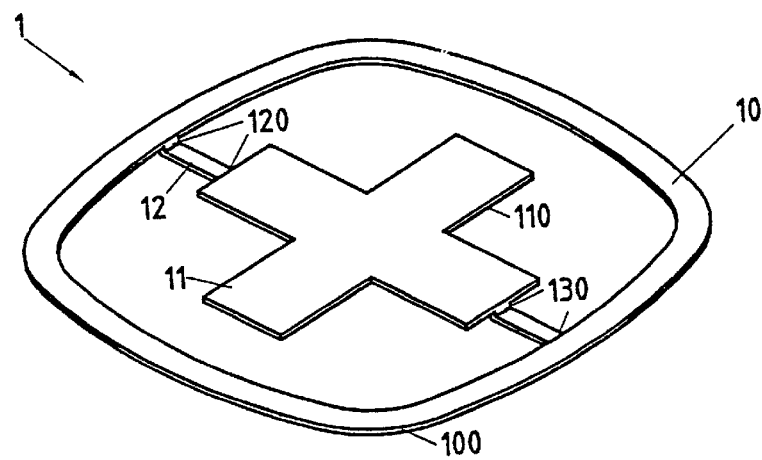

United States Patent
Ackeret et al.

[11] Patent Number: 6,132,834
[45] Date of Patent: Oct. 17, 2000

[54] PLASTIC ARTICLE COMPRISING A MOLDED BODY AND AN INLAID DECORATIVE ELEMENT AND METHOD OF MANUFACTURE OF SAID PLASTIC ARTICLE

[75] Inventors: Peter Ackeret, Küsnacht; Maurice Cachot, Delémont, both of Switzerland

[73] Assignee: Wenger SA, Delemont, Switzerland

[21] Appl. No.: 08/985,830

[22] Filed: Dec. 5, 1997

[30] Foreign Application Priority Data

Dec. 11, 1996 [CH] Switzerland .............................. 3037/96

[51] Int. Cl.[7] ...................................... B44C 1/26
[52] U.S. Cl. .............................. 428/67; 264/275; 264/247
[58] Field of Search ......................... 428/67, 545; 7/118, 7/167, 168; 81/177.7; D8/99, 105, 306; 264/135, 275, 247, 249; 29/527.1

[56] References Cited

U.S. PATENT DOCUMENTS

| | | | |
|---|---|---|---|
| 2,166,879 | 7/1939 | Schmalz | 18/59 |
| 4,481,160 | 11/1984 | Bree | 264/135 |
| 5,226,993 | 7/1993 | Tukakoshi et al. | 156/63 |
| 5,604,006 | 2/1997 | Ponchaud et al. | 428/67 |

FOREIGN PATENT DOCUMENTS

| | | | |
|---|---|---|---|
| 412601 | 2/1991 | European Pat. Off. | B29C 33/14 |
| 743166 | 11/1996 | European Pat. Off. | B29C 70/68 |
| 0087342 | 4/1988 | Japan . | |
| 317950 | 8/1929 | United Kingdom . | |
| 651253 | 3/1951 | United Kingdom . | |

OTHER PUBLICATIONS

Federico Strasser–Molding Metal Inserts Into Plastic Parts–369 Plastics Engineering–vol. 36 (1980).–No, 10–pp. 17–22.

*Primary Examiner*—Ellis Robinson
*Assistant Examiner*—Laura L. Lee
*Attorney, Agent, or Firm*—Goodman & Teitelbaum, Esqs.

[57] ABSTRACT

Pocket knife, having at least one side fabricated from a molded plastic material, includes a decorative element, for example a cross, inlaid flush with an outer surface of the side. The decorative element is stamped from a sheet of steel to provide a cross and a square frame which are positioned with respect to each other by two attachments. A greater portion of each attachment is pressed down, by stamping, from a curved first plane occupied by the cross and the frame to a lower second plane under the curved first plane. This greater portion is covered over by the molded plastic material. At least one portion of lateral flanks of the decorative element is disposed at an inclined angle in order to be partially covered over with the molded plastic material. Only one single operation is required for injecting the side of the pocket knife and for inlaying the decorative element in the outer surface of the side of the pocket knife.

13 Claims, 5 Drawing Sheets

PLASTIC ARTICLE COMPRISING A MOLDED BODY AND AN INLAID DECORATIVE ELEMENT AND METHOD OF MANUFACTURE OF SAID PLASTIC ARTICLE

This invention concerns a piece as set forth below and a method of manufacture of said piece also set forth below. In particular, this invention concerns a multifunctional pocket knife whose at least one side of molded plastic incorporates an inlaid decorative element, for example a Swiss cross.

Multifunctional pocket knives of the "Swiss knife" type generally comprise a plurality of blades pivoting between two sides. The two sides of the knife are metallic, that is frequently formed by a metal sheet covered over with molded plastic by pressing or injection. In the latter case, at least one of the two sides of the knife generally includes a decorative element, for example a Swiss cross, a text or an advertising logo.

Understood by decorative element in the description which follows and in the claims is any design, motif, logo or text, for example of an aesthetic, advertising or descriptive nature, which appears on an outer surface of the manufactured piece.

Various methods are known for placing a decorative element on a flank of a knife. An economical method consists simply in printing a text or a design on the flank of the knife by conventional means, for example serigraphy. It is difficult to print neatly on the knife surfaces which are not absolutely flat. Moreover, such printing directly on the plastic has poor resistance to the friction and wear and tear to which a pocket knife is subjected.

Another known method consists in cutting a decorative element, of square shape, for example, into a sheet of aluminum of about one millimeter thickness, and carefully printing the Swiss cross or any other decorative motif. This element is then glued in a recess, adapted and machined for this purpose in a side of the knife. This method is rather costly to carry out. Moreover, it is difficult to control very precisely the depth of the machined recess so that there often remains an unaesthetic border around the inlaid decorative element.

Another method consists in stamping the decorative motif into a sheet of very fine steel, of about 0.1 millimeter thickness, then, under great pressure and with an appropriate amount of heat, inlaying the motif in the side of the knife. This method is more economical and enables the depth of the inlay to be controlled precisely so that the metallic element becomes exactly flush with the outer surface of the side of the knife.

This method, however, is difficult to implement when the decorative element to be inlaid includes a plurality of parts which must be positioned and/or spaced precisely, one with respect to the other. This is especially the case when the decorative element comprises a Swiss cross surrounded by a square or shield-shaped frame. It is also the case, for example, when the decorative element is made up of a text with several disjointed characters, a logo or an emblem having several parts. Difficulties can arise even when the decorative element comprises a single piece, for example a single letter, including parts which are not very integrated among them, for example the two ends of a capital C. In this case, the solution generally adopted consists in fixing by means of attachments the parts which must be positioned, one with respect to the other. In the case of a Swiss cross, for example, a known way is to connect the cross to a frame by two inconspicuous attachments prolonging the ends of the horizontal branches of the cross. In this way, the cross and the frame can be inlaid in the molded side without positioning defects.

These attachments are not very aesthetic, however, and change the subjective impression created by the decorative element. This is particularly the case when the decorative element includes a large number of disjointed parts which thus have to be connected by a large number of attachments, for example when the decorative element is made up of a text of several letters.

An object of this invention is to propose an improved piece comprising a molded body and a decorative element. In particular, an object of this invention is to propose an improved pocket knife including at least one side of molded plastic and one decorative element, for example a cross, inlaid in the side.

Another object is to propose an improved method of manufacture of such a piece. According to the invention, these objects are attained by means of a piece comprising a body of molded plastic and a decorative element inlaid flush with the outer surface of said body. The decorative element is produced starting from a sheet of a second material, for example a metallic sheet, and includes at least two parts, positioned, one with respect to the other, with attachments. At least the greater portion of the attachments are located under the plane (which can be a curved plane, for example convex) occupied by the visible portion of the decorative element. This portion of the attachments is thus covered over by the plastic material of the body of the piece.

Figure 1B:
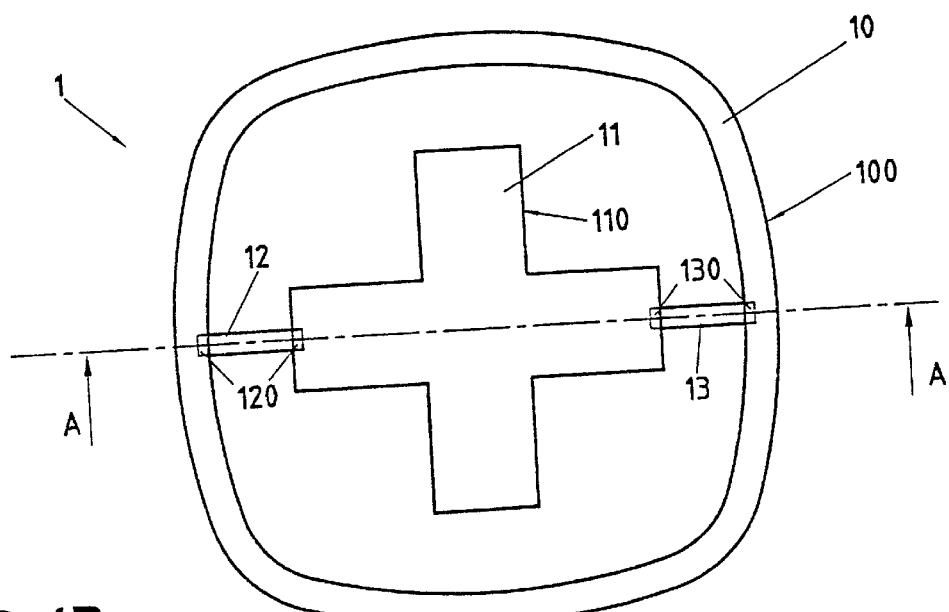
Figure 1C:
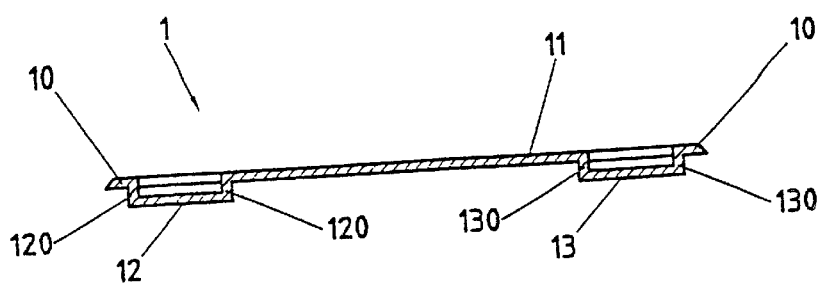
Figure 2A:
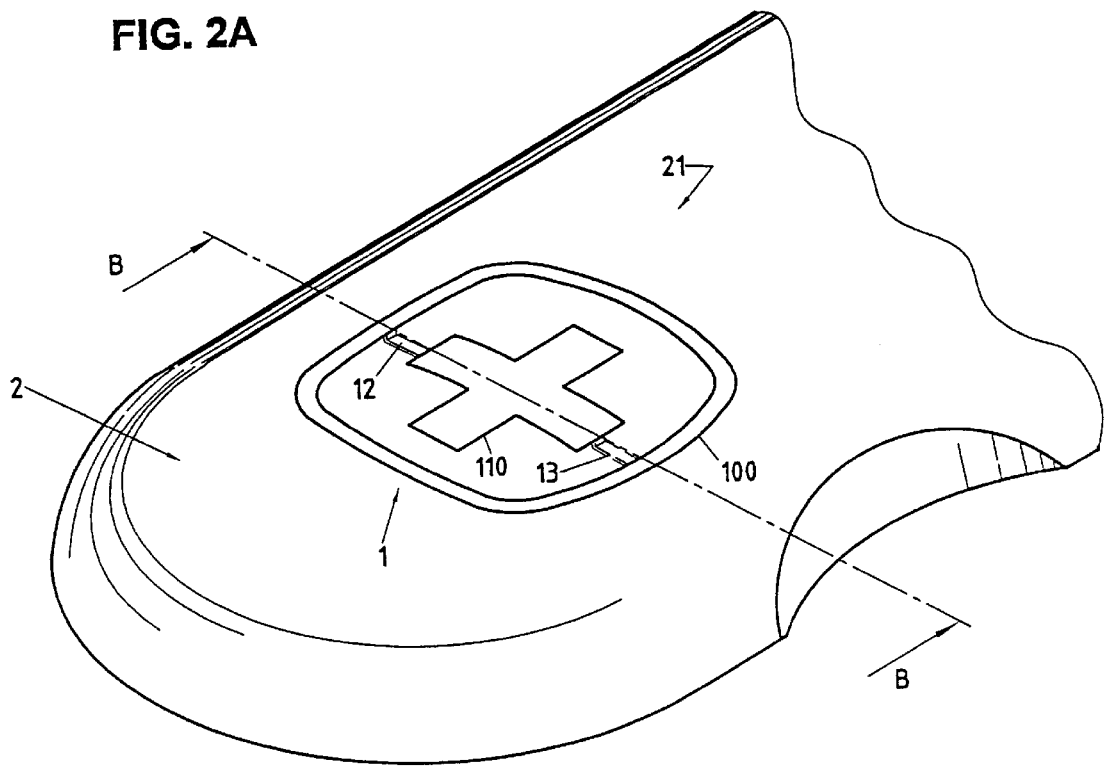
Figure 2B:
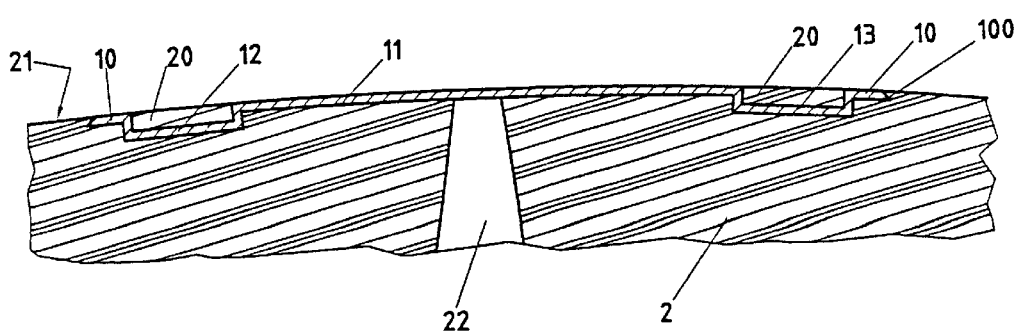
Figure 3:
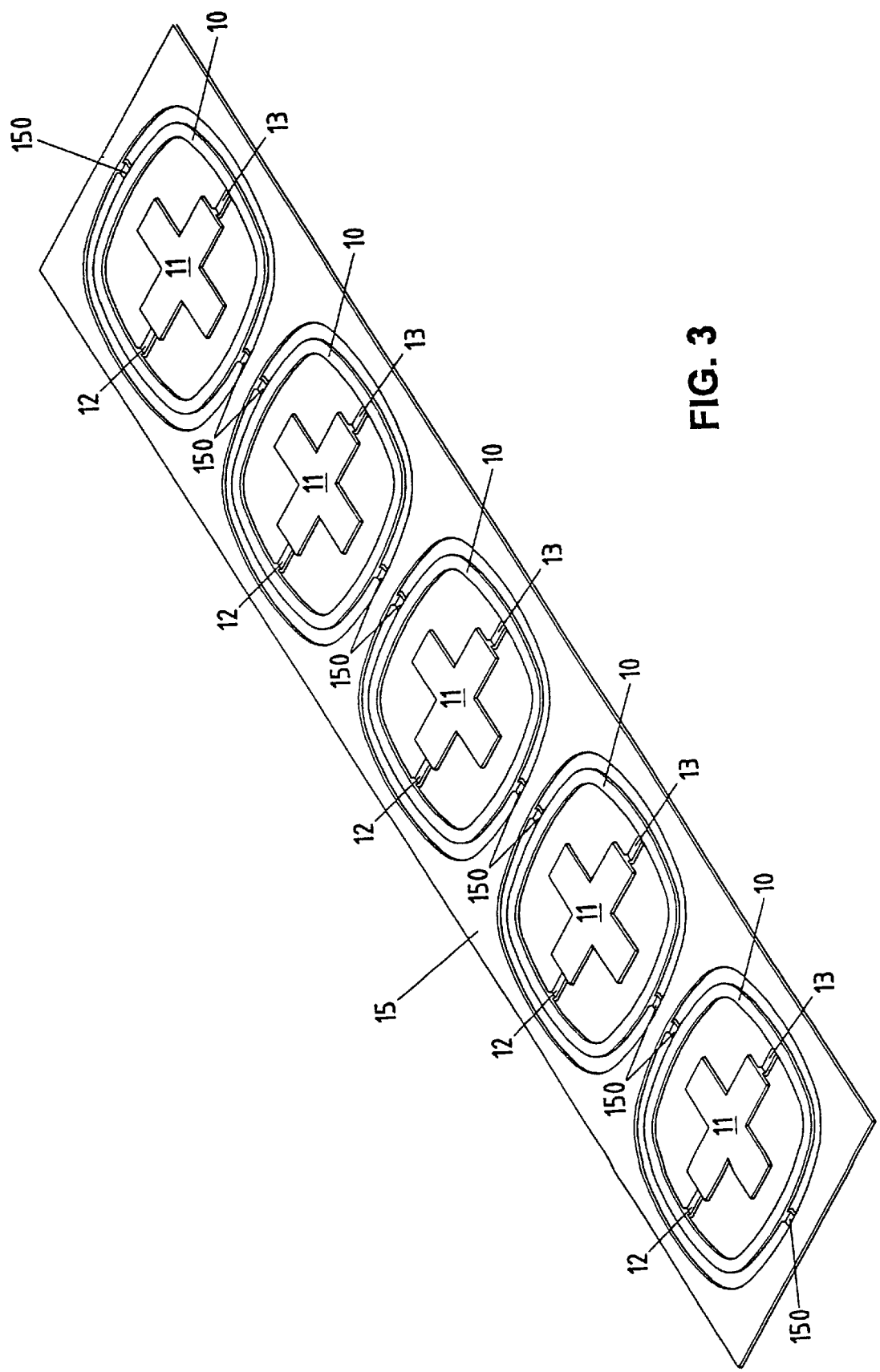
Figure 4A:
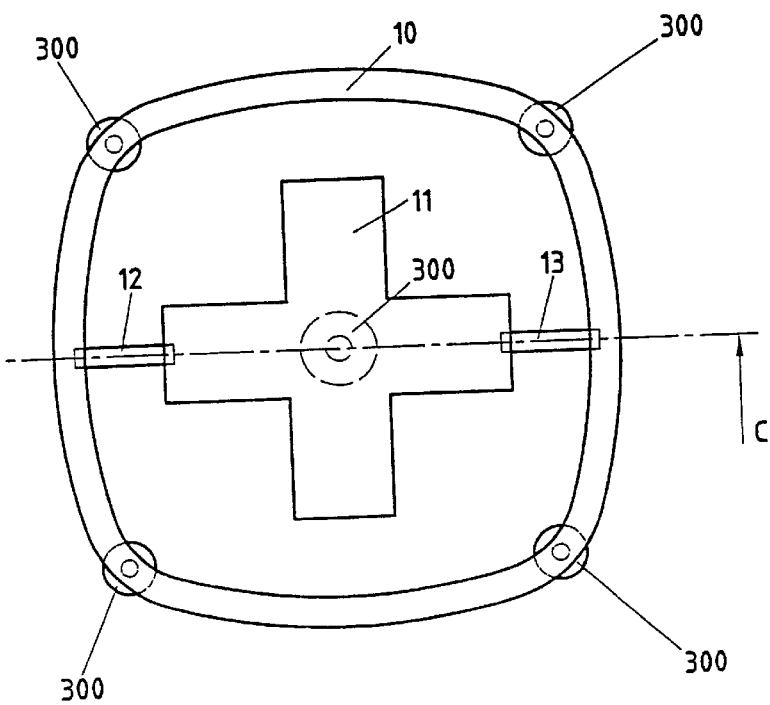
Figure 4D:
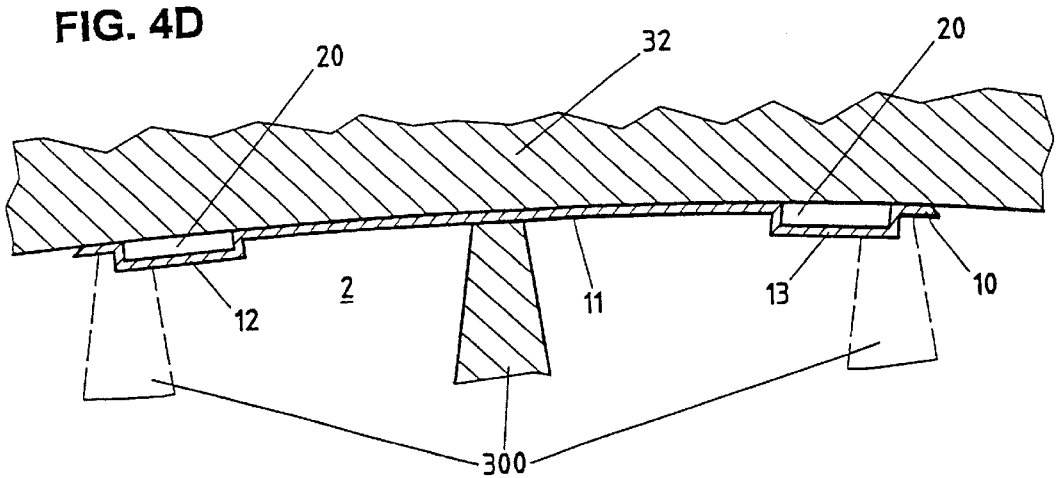
Figure 4B:
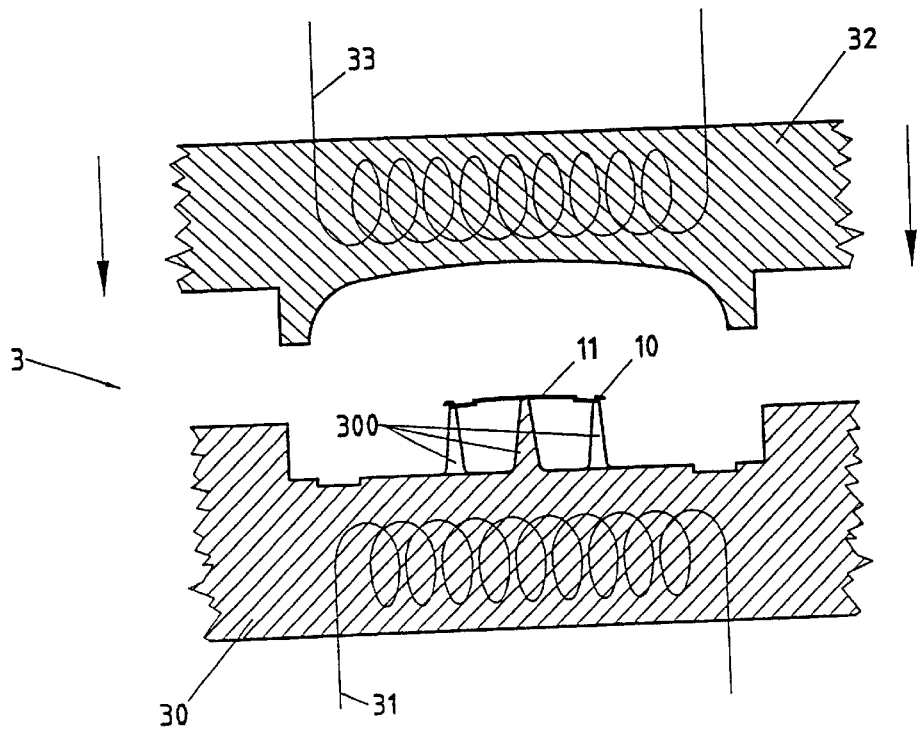
Figure 4C:
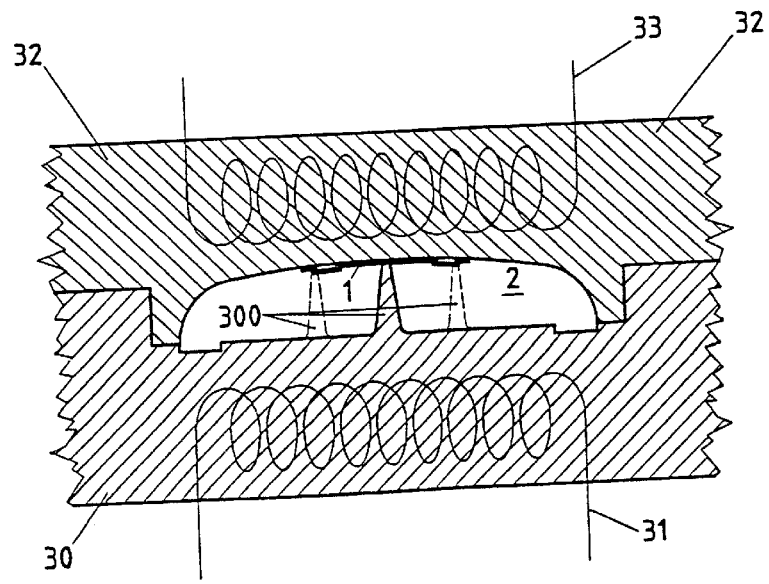

The invention will be better understood from the description which follows, given by way of example and illustrated with the following figures:

FIG. 1A, a view in perspective of a decorative element including two parts, positioned one with respect to the other by means of two attachments, pressed down by stamping according to the invention;

FIG. 1B, a view from above of the decorative element of FIG. 1A;

FIG. 1C, a section of the decorative element along the line A—A of FIG. 1B;

FIG. 2A, a view in perspective of a portion of a knife side of molded plastic including a decorative element inlaid according to the invention;

FIG. 2B, a section of the portion of the knife side of molded plastic, including the decorative element, along the line B—B of FIG. 2A;

FIG. 3, a view in perspective of a metallic sheet die cut and then pressed down by stamping so as to define a plurality of decorative elements according to the invention;

FIG. 4A, a view from above of the decorative element of FIG. 1A, illustrating the points of support of the decorative element when the piece is molded;

FIG. 4B, a section of the device for molding the piece, before molding;

FIG. 4C, a section of the piece and of the device for molding the piece, during molding;

FIG. 4D, an enlargement of a portion of the FIG. 4C, showing very specifically the decorative element during molding.

FIGS. 1A to 1C show, by way of example, a decorative element according to the invention. In this example, the decorative element 1 is made up of a Swiss cross 11 surrounded by a square frame 10. The element is intended, for example, to be inlaid in the side of a multifunctional pocket knife of the "Swiss knife" type. The decorative element 1 is produced by cutting, preferably die cutting, starting with a fine sheet of steel, for example a sheet of steel with a thickness of 0.1 to 0.15 millimeters. The cross 11 and the frame 10 must be positioned with precision on the flank of the knife. In particular, it is important that the cross 11 be perfectly centered in the middle of the frame 10. To achieve this object, the decorative element includes attachments, in this example two attachments 12, 13 connecting the cross 10 to the frame 11. These attachments have no other function but to correctly position and space the two parts of the element 1. As can be seen especially in the view from above of FIG. 1B, the attachments 12, 13 considerably change the visual impression created by the decorative element 1. They thus fulfill no aesthetic function.

According to the invention, the attachments 12, 13 are pressed down by stamping into a different plane from the plane occupied by the visible portion of the decorative element, that is to say below the plane occupied by the cross 11 and the frame 10. This operation can be carried out rather easily by known means of stamping the element 1. The pressed-down attachments have a U shape and comprise a portion substantially parallel to the plane occupied by the visible portion 10, 11 of the decorative element as well as two lateral flanks 120, 130. The latter are preferably substantially perpendicular to the said plane occupied by the visible portion 10, 11, but could also be oblique. To this end, it is important during the stamping to see to it that the edges of demarcation between the lateral flanks 120, respectively 130, and the parts 10, 11 of the decorative element are as clean as possible, that is to say perfectly straight and with a cutting edge angle of very close to 90 degrees.

In FIGS. 1A to 1C, the cross 11 is connected to the frame 10 by two attachments 12, 13 disposed symmetrically with respect to the cross, between the frame 11 and the ends of two opposite branches. It is however possible to use a number of different attachments, for example four attachments distributed on the four ends of the cross 11. The invention also applies to decorative motifs other than crosses, for example to texts, designs, motifs or logos of an advertising or other nature, and including different disjointed parts which must be connected by any number of attachments. In the example illustrated, the cross 11 and the frame 10 are obtained starting from a flat sheet. The upper surface of the decorative element 11 can however, have a certain relief or a texture. In addition, the plane occupied by the cross 11 and the frame 10 can be curved before or after stamping. Finally, depending upon the decorative motif and the creativity of the artists, attachments could be provided having only one portion pressed down by stamping. It is also possible to use attachments where the depth of stamping varies depending upon their length, that is to say which do not occupy a plane parallel to the plane of the cross 11 and frame 10.

In a preferred variant, at least one portion of the edges or lateral flanks 100, respectively 110, of the frame 10, respectively of the cross 11, are slanted or beveled in such a way to be able to be covered over partially with the plastic material, as will be seen further below.

FIGS. 2A and 2B illustrate, by way of an example piece, a portion of side 2 of a molded plastic article such as a pocket knife including an inlaid Swiss cross 1. The side of the knife is molded in plastic. The Swiss cross 1 comprises two portions 10, 11 inlaid flush with the outer surface 21 of the side 2 and connected by two attachments 12, 13 pressed down below this outer surface. The attachments 12, 13 are completely covered over with the plastic 20 of the side 2 in such a way that they are no longer visible. The attachments 12, 13 thus do not interfere with the visual impression created by the decorative motif 12, 13. It is therefore possible, if necessary, to distribute a large number of attachments with a minimum of aesthetic restraints.

It can be noted in particular in FIG. 2B that the outer surface 21 of the side of the knife is convex. The decorative element 1 follows this curvature and thus remains perfectly flush with the surface 21. The decorative element is preferably produced by cutting and then pressing down by stamping starting from a flat metallic sheet. It is thus curved only when it is inlaid in the side of the knife. Its natural elasticity then tends to make it resume its initial shape and to make it leave its accommodation. It is kept down, however, by the attachments 12, 13 covered over with molded plastic 20. To reduce further the risk that badly held portions, for example the vertical ends of the cross 11 or the corners of the frame 10, leave their accommodation, at least a portion of the lateral flanks 100, 110 is slanted so as to be covered over with molded plastic.

The method of producing the piece according to the invention will now be described with reference to the FIGS. 3 and 4A to 4D. In FIG. 3 the decorative element 1 is produced, first of all, by cutting starting with a metallic sheet having a thickness of about 0.1 to 0.15 millimeters. Understood here by cutting is preferably die cutting. Depending upon the material of the sheet 15 and the number of pieces needed, the cutting will preferably be carried out by means of a conventional cutting table, by laser, by photoengraving, etc. In the example illustrated, the decorative elements 1 are cut in the sheet 1, with links 150 remaining between the individual elements 1 and the rest of the sheet. The links 150 will be cut or torn later when inlaying the elements 1 in the body of the knives. In this way it is possible to easily transport, handle and stock a large number of decorative elements connected by bands on a pre-cut sheet 15. In a variant, the cut elements 1 are kept on an adhesive sheet for their handling and storage prior to use.

After cutting the decorative elements 1, the two attachments 12, 13 joining together the two parts 10, 11 are pressed down by stamping under the main surface defined by the cross 11 and the frame 10. Die stamping techniques are known to one skilled in the art, and we shall not describe them in further detail here. Preferably the links 150 are also pressed down by stamping in order to facilitate their later separation and in order to press down any possible remains of the links 150 under the outer surface 21 of the molded piece. Again, it is important when stamping that the edges of demarcation between the pressed down links 150 and the frame 11 be as clean as possible, that it to say perfectly straight and with a cutting edge angle of very close to 90 degrees.

After stamping the decorative elements 1, these are transported by known means as far as the machine for molding 3 (FIG. 4B) the side of the knife 2. The machine for molding consists here of a conventional molding press 3. The mold is formed by two female molds 30 and 32. The upper female mold 32 allows the outer face 21 of the side 2 to be molded whereas the lower female mold 30 allows the inner face of this side to be molded. Heating means 31, respectively 33, are provided to heat the two female molds 30, respectively 32, to a temperature above the melting point of the plastic used for the side.

The decorative element 1 is positioned by means not shown, preferably by a robot, on a support 300 on the inside of the lower female mold 30. The support 300 can have any shape adapted to the shape of the cut decorative element 1 in this example the support 300 is made up of five fine points supporting the center of the Swiss cross 11 as well as the four corners of the frame 10, as illustrated in particular in FIG.

4A. Other shapes and arrangements can of course be conceived for the support 300. The decorative element 1 is maintained on the support 300 by magnetism or by vacuum. The height of the support 300 is such that the decorative element 1 becomes exactly flush with the outer surface 21 of the molded side; that is to say that the height of the points 300 is equal to the thickness of the side at that location minus the thickness of the decorative element 1.

Known means (not shown) are provided to bring the melted plastic material between the two female molds. The material to be melted can consist of any known synthetic granular or powder substance, for example Celidor (registered trademark) granules. The two parts of the mold are then closed while exercising an appropriate amount of pressure (FIGS. 4C and 4D). The upper surface of the decorative element 1 then comes right into contact with the inner surface of the upper female mold 32.

The mold is kept closed long enough and under sufficient pressure to ensure a homogeneous distribution of the material in the mold. In particular it is important to see to it that the pressure and the fluidity of the plastic are sufficient so that it covers the attachments 12, 13 perfectly, and, if applicable, the slanted flanks 100, 110 of the decorative element 1. The temperature is then lowered in order to make the plastic harden, then the piece 2 can be removed from the mold. If the decorative element 1 is held on the support 300 by vacuum, the means (not shown) allowing the vacuum to be created are preferably switched off, or even reversed, to facilitate the removal of the piece 2 from the mold.

The result obtained after removal from the mold is a piece including a decorative element 1 perfectly flush with the outer surface 21 of the piece. Openings 22 (FIG. 2B) corresponding to the support 300 remain behind the decorative element 1. These openings are totally concealed, however, by the cross 11 and the frame 10, and thus remain invisible once the piece 2 is glued on the multifunctional knife.

An additional advantage achieved by the invention is that the injection of the body 2 of the side and the inlaying of the decorative element 1 is made possible in a single operation and by means of a single machine.

Other known molding methods can be applied to produce the side 2 containing the decorative element 1 with the covered-over attachments 12, 13. For example, injection molding can also be used.

What is claimed is:

1. A molded plastic article with decorative element comprising:
    a body (2) fabricated of a molded plastic first material and a decorative element (1), said decorative element (1) being fabricated from a sheet (15) of a second material, said decorative element (1) including at least first and second parts (10, 11) positioned one with respect to the other in a first plane, said first and second parts (10, 11) being inlaid flush with an outer surface (21) of said body (2) to define first and second visible portions (10, 11) respectively;
    said second material of said sheet (15) of said decorative element (1) being a metallic sheet;
    attachment means for connecting said first and second visible portions (10, 11) together to correctly position and space said first and second visible portions relative to each other, at least a greater surface area of said attachment means being stamped down into a second plane below said first plane of said first and second parts (10, 11); and
    at least said greater surface area of said attachment means being covered over with a portion (20) of said molded plastic first material, said attachment means including one or more inconspicuous attachment elements (12, 13).

2. A molded plastic article with decorative element according to claim 1, wherein said first visible portion (10) is an outer part (10) and said second visible portion (11) is an inner part (11) of said decorative element (1), said outer part (10) is disposed around said inner part (11) in said first plane on said outer surface (21) of said body (2) so that said outer part (10) frames said inner part (11).

3. A molded plastic article with decorative element according to claim 2, wherein said inner part (11) is constructed as a cross (11) including a first pair of linearly opposite branches disposed at a right angle to a second pair of linearly opposite branches, said attachment elements (12, 13) being disposed between associated ends of at least one of said first and second pairs of linearly opposite branches of said cross (11) and said outer part (10).

4. A molded plastic article with decorative element according to claim 3, wherein said outer part (10) is constructed as a square frame, said cross (11) being centered in said square frame in said first plane on said outer surface (21) of said body (2).

5. A molded plastic article with decorative element according to claim 1, wherein said outer surface (21) of said body (2) and said first plane occupied by said first and second visible portions (10, 11) of said decorative element (1) are curved.

6. A molded plastic article with decorative element according to claim 5, wherein edge portions of said decorative element (1) define lateral flanks (100, 110), at least one of said lateral flanks (100, 110) being sloped downwardly and outwardly from a top surface to a bottom surface of said decorative element (1) so that said at least one of said lateral flanks (100, 110) is partially covered over with said molded plastic first material.

7. A molded plastic article with decorative element according to claim 1, wherein said greater surface area of said attachment means, which is covered over with said portion (20) of said molded plastic first material, is part of an attachment portion of each of said attachment elements (12, 13), said attachment portion being substantially parallel to said first plane occupied by said first and second visible portions (10, 11) of said decorative element (1).

8. A molded plastic article with decorative element according to claim 7, wherein said attachment elements (12, 13) include lateral flanks (120,130) for connecting each said attachment portion to an associated one of said first and second visible portions (10, 11) of said decorative element (1).

9. A molded plastic article with decorative element according to claim 8, wherein said lateral flanks are substantially perpendicular to said first plane occupied by said first and second visible portions (10, 11) of said decorative element (1).

10. A molded plastic article with decorative element according to claim 8, wherein said lateral flanks are disposed at an oblique angle extending to said first plane occupied by said first and second visible portions (10, 11) of said decorative element (1).

11. A molded plastic article with decorative element according to claim 8, wherein edges of demarcation between said lateral flanks (120, 130) and said first and second visible portions (10, 11) of said decorative element (1) are straight with a cutting edge angle of close to 90 degrees.

12. A molded plastic article with decorative element according to claim 2, wherein said decorative element (1) is stamped from said sheet (15) to provide links (150) so that said links (150) provisionally connect said decorative element (1) to said sheet (15) after stamping operation, said links (150) being pressed down into a different plane from said first plane of said first and second visible portions (10, 11) before separation thereof.

13. A molded plastic article with decorative element according to claim 1, wherein said body (2) is an outer portion of a pocket knife, and said decorative element (1) is disposed on at least one side of said pocket knife.

* * * * *